United States Patent [19]

Stein et al.

[11] E Re. 28,544

[45] Reissued Sept. 2, 1975

[54] RADIANT ENERGY IMAGING WITH SCANNING PENCIL BEAM

[75] Inventors: Jay A. Stein, Newton; Roderick Swift, Belmont, both of Mass.

[73] Assignee: American Science & Engineering, Inc., Cambridge, Mass.

[22] Filed: Aug. 2, 1974

[21] Appl. No.: 493,868

Related U.S. Patent Documents

Reissue of:

[64] Patent No.: 3,780,291
Issued: Dec. 18, 1973
Appl. No.: 160,363
Filed: July 7, 1971

[52] U.S. Cl. .....250/369; 250/358; 250/363

[51] Int. Cl.[2] ..... G01T 1/20

[58] Field of Search ..... 250/358, 363, 359, 360, 71.5 R, 71.5 S, 77, 83.30, 105, 52

[56] References Cited

UNITED STATES PATENTS

| | | | |
|---|---|---|---|
| 3,106,640 | 10/1963 | Oldendorf | 250/360 |
| 3,146,349 | 8/1964 | Jordan | 250/391 |
| 3,151,245 | 9/1964 | Wilson, Jr. | 250/105 |
| 3,790,799 | 2/1974 | Stein et al. | 250/363 |

FOREIGN PATENTS OR APPLICATIONS

| | | |
|---|---|---|
| 519,594 | 10/1937 | United Kingdom |

*Primary Examiner*—Davis L. Willis
*Attorney, Agent, or Firm*—Charles Hieken; Jerry Cohen

[57] ABSTRACT

A pencil beam of X-rays scans an object along a line of direction before an X-ray detector to produce an image of the line along a picture tube. By relatively displacing the object scanned and the line of scan in a direction transverse to the line of scan, a sequence of lines appear on the display to produce an image of concealed objects, such as guns.

11 Claims, 2 Drawing Figures

INVENTORS
JAY A. STEIN
RODERICK SWIFT
BY Charles Kieken
ATTORNEYS

RADIANT ENERGY IMAGING WITH SCANNING PENCIL BEAM

Matter enclosed in heavy brackets [ ] appears in the original patent but forms no part of this reissue specification; matter printed in italics indicates the additions made by reissue.

BACKGROUND OF THE INVENTION

The present invention relates in general to radiant energy imaging and more particularly concerns novel apparatus and techniques for displaying a visual image of concealed objects with sufficient resolution to identity the object while keeping the intensity of radiation relatively low. The system is reliable, relatively economical and may be operated by relatively unskilled personnel.

The problem of detecting contraband concealed in packages and on persons is a serious one. X-ray equipment is useful for assisting in the discovery of concealed contraband. Conventional X-ray equipment is costly, requires operation by skilled personnel and may well subject personnel and parcels to undesired excessive dangerous radiation.

Accordingly, it is an important object of this invention to provide an X-ray imaging system that overcomes one or more disadvantages of conventional systems.

It is an important object of this invention to provide an X-ray imaging system for displaying an image of concealed devices without exposing personnel or parcels to excessive radiation.

It is a further object of the invention to achieve one or more of the preceding objects with apparatus that is relatively inexpensive and capable of being operated by relatively unskilled personnel.

It is a further object of the invention to achieve one or more of the preceding objects with apparatus that operates reliably and is relatively easy to manufacture.

SUMMARY OF THE INVENTION

According to the invention, there is means for scanning a radiation sensitive detector along a curve with a pencil beam of radiation to provide a line image signal characteristic of radiant energy response between the source of the pencil beam and the radiation sensitive detector, and means for displaying the image represented by the image signal. The radiation sensitive detector and the source are in fixed relationship. The detector may be positioned for receiving direct and/or reflected or scattered radiation. Preferably there is means for relatively displacing the curve scanned and an object to produce a sequence of image signals representative of the radiant energy response of the object in two dimensions. There is means for relatively displacing the region embracing the object and an assembly comprising the source and radiation sensitive detector or detecting means to establish relative translating motion in a direction transverse to a line joining the source and the detecting means. Preferably the curve is a line with the relative displacement between object and line being in a direction orthogonal to the line. Preferably the detector comprises a sodium iodide or cesium iodide crystal that produces a visible manifestation of the intensity of the incident radiation that may be sensed by a photodetector to provide a characteristic electrical output signal that may be applied to a television display system that may incorporate a storage tube.

Numerous other features, objects and advantages of the invention will become apparent from the following specification when read in connection with the accompanying drawing in which:

DETAILED DESCRIPTION OF PREFERRED EMBODIMENTS

Figure 1:
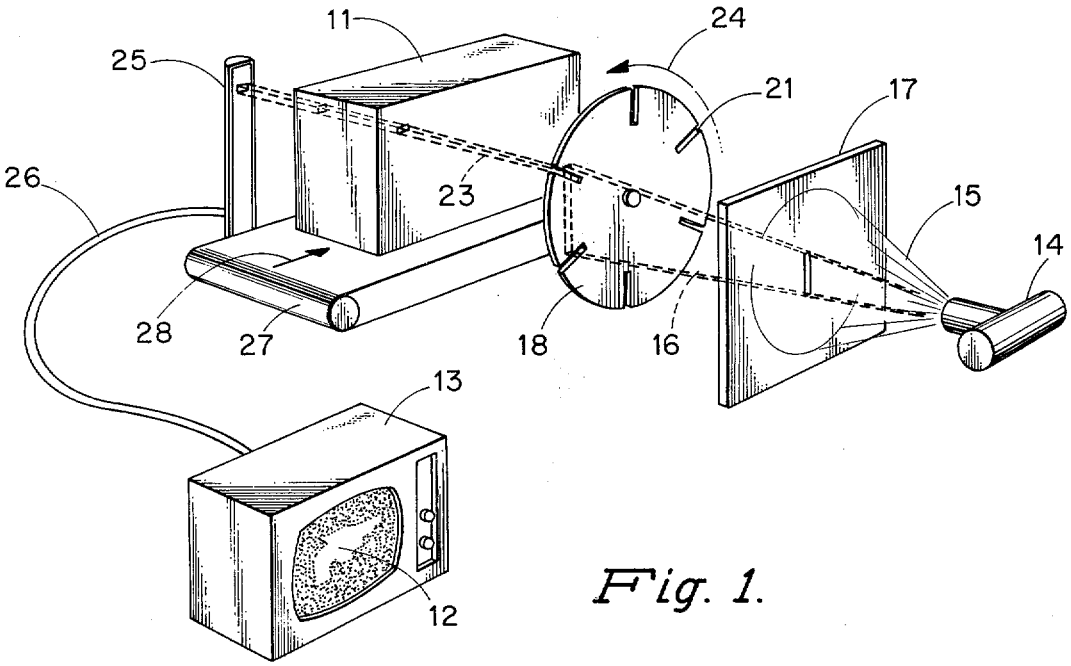
FIG. 1 is a pictorial representation of a parcel inspection system according to the invention.

With reference now to the drawing and more particularly FIG. 1 thereof, there is shown a pictorial representation of a system according to the invention for scanning parcels. A parcel 11 is scanned by the invention to produce an image 12 of contraband on the video storage and display unit 13. An X-ray tube 14 provides a generally conical beam of X-rays 15 that are collimated into a fan beam 16 by slit collimator 17 oriented generally vertically as shown and incident upon the rotating collimation disc 18 formed with an array of peripheral radial slits, such as 21, for intercepting fan beam 16 to produce pencil beam 23. Pencil beam 23 scans parcel 11 and radiation sensitive detector 25 from top to bottom as rotating disc 18 rotates in the direction of arrow 24 to provide an image signal over output line 26 that is transmitted to video storage and display unit 13 to produce the image 12 of the parcel scanned as conveyor 27 carries parcel 11 in the direction of arrow 28 across the line being scanned.

Since most specific elements of the system are known to those skilled in the art who can practice the invention from an examination of FIG. 1 and the accompanying description, minute specific details are omitted so as to avoid obscuring the invention.

The geometry and timing of the system is arranged so that each slit 21 causes a new pencil beam to strike the top of detector 25 just after the previous pencil beam has swept past the bottom of the detector. That is to say, the height of fan beam 16 corresponds substantially to the separation between adjacent ones of slits 21 at substantially the maximum radial distance from the edge of disc 18 where the slits intercept fan beam 16. While FIG. 1 shows the elements that provide the scanning pencil beam source in exploded form to better illustrate the principles of the invention, the elements 14, 17 and 18 are preferably housed relatively close together in an enclosure that shields radiation so that the only significant radiant energy that escapes is that in pencil beam 23.

As parcel 11 move past the line being scanned, it differentially attenuates the X-rays in pencil beam 23 incident upon detector 25 so that the electrical signal provided on output line 26 is amplitude modulated in proportion to the instantaneous X-ray flux incident upon it. This signal thus corresponds to a vertical line image of the transmissivity of parcel 11 and is analogous to one scan line of a television video signal. As parcel 11 moves horizontally past the line being scanned, sequential pencil beams intercept slightly displaced regions of parcel 11 so that the corresponding electrical signals from detector 25 may be appropriately displayed line-by-line to produce a two dimensional image of parcel 11 in X-rays analogous to the display of a picture on a television monitor as formed by line-by-line images. The output of detector 25 may thus be processed in accordance with the same storage and display techniques used in conventional video systems to store and display single raster images. Since these techniques are well known in the art, further discussion of them is unnecessary here.

Although detector 25 is shown behind the object being scanned for responding to the radiant energy transmitted through the object being scanned, it is within the principles of the invention to position the detector in the region between the radiant energy source and the object being scanned to respond to the scattered energy. This arrangement helps the apparatus detect concealed objects having different scattering characteristics from their surrounding. Moreover, a system according to the invention may include both detecting means before and behind the object being scanned for simultaneously providing signals representative of both radiant energy transmission and scattering. Appropriately combining such signals may help increase the ability of the system to detect a wide variety of concealed objects.

Figure 2:
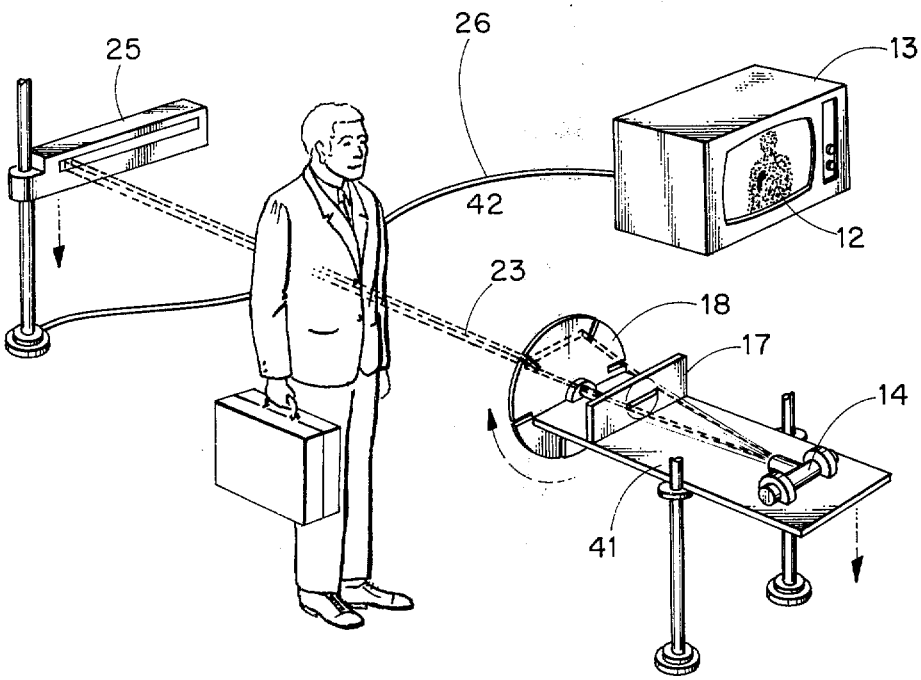
FIG. 2 is a pictorial representation of an exemplary embodiment of the invention for inspecting personnel.

Referring to FIG. 2, there is shown a pictorial diagram illustrating the logical arrangement of a system according to the invention for personnel inspection. This system embodies the principles of the system of FIG. 1; however, the pencil beam scans horizontally, and the scanning system and person relatively move vertically to produce a two dimensional image of the person. Like elements in the system of FIG. 2 are designated by corresponding reference numerals.

A vertically movable platform 41 supports the pencil beam source comprising X-ray tube 14, fan beam collimator 17 and rotating collimation disc 18 to scan person 42 along a sequence of horizontal lines as detector 25 and platform 41 move down together. Detector 25 is also supported for vertical displacement.

Details of specific means for vertically displacing detector 25 and platform 41 are well within the skill of one having ordinary skill in this art and are omitted so as to avoid obscuring the principles of the invention. They might, for example, be guided by vertical shafts, at least one of which was a rotating feedscrew supporting detector 25 and platform 41 rotating in synchronism so that platform 41 and detector 25 move together. Numerous other techniques could be employed for effecting vertical scanning. For example, the person being scanned could be placed upon a platform that was raised and lowered. This approach would be especially convenient where a person entered the scanning area on one level and left it on another, an especially convenient arrangement, where, for example, an airline passenger might enter at ground level and leave closer to boarding ramp level. Video storage and display unit 13 then displays image 12 which, in this embodiment, is an image formed of a sequence of horizontal lines as distinguished from the sequence of vertical lines forming the image in FIG. 1.

Considering now specific parameters for a parcel examining system of FIG. 1, such a system could examine parcels with dimensions up to 32 × 20 × 16 inches provided that parcels with dimensions exceeding 20 inches are oriented with their long axes parallel to their direction of travel and all parcels are guided close to detector 25 with a distance between source and detector of approximately 6 feet and the height of detector 25 about 24 inches. Then the maximum distortion caused by differences in magnification of the front and back surfaces of parcels will never exceed ± 19 percent from the average magnification and would occur only rarely. Objects with overall depths less than 20 inches along the direction of the scanning beam would have proportionately less distortion.

Resolution capabilities of 1 millimeter square are readily obtainable for identification of most objects having characteristic dimensions of several inches. With 1 mm resolution a 20 inch object could be covered in 500 scans without gaps or overlap, larger parcels being covered by more scans or greater spacing between scans. In either case the image could be displayed on a standard 512-line television monitor with negligible loss of detail.

For a nominal conveyor speed of 10 inch/second (250 mm/second), 250 scans/second (or 4 milliseconds/scan) achieves 1 millimeter resolution where each scan covers the full 24 inches height of the detector so that a 20-inch long parcel could be scanned in 2 seconds.

With X-ray tube 14 conventional and operating at moderate voltage and current (60–100 kv, 10 ma,) it typically produces a flux at 6 feet (the distance to detector 25) of millions of X-rays per $mm^2$ per second. A filtered tungsten target tube operating at 100 kv and 15 ma provides typically an X-ray flux at detector 25 of about $10^7$ X-rays/$mm^2$/sec. with a broad energy spectrum extending from 20 to 100 kev. Generating 250,000 resolution elements in 2 seconds results in each resolution element being irradiated for about 2/250,000 seconds or 8 microseconds. With an X-ray flux at the detector 25 of $10^7$ X-ray $mm^2$/second, each resolution element would (in the absence of an X-ray absorbing object) receive about 80 X-rays per exposure. Taking into account the absorption by packing material of low energy X-rays, 10–20 X-rays/resolution element would typically be detected during a 2 second total exposure, about the statistically significant number of X-rays required to distinguish white from black in adjacent resolution elements so that the proposed 2-second exposure time is appropriate to achieve 1 × 1 mm resolution.

A feature of the invention is that the X-ray detection process is ideal. The X-ray quantum efficiency of the detector 25 is close to 100 percent. X-rays will produce output pulses several times larger than photomultiplier noise (dark) pulses so that the latter can be completely eliminated by threshold discrimination. Moreover, since the detector can be made very narrow, the background contribution from radiation scattered by a parcel is negligibly small so that the invention may use minimum X-ray dosage for 1 mm resolution, typically less than 0.003 mrads per image compared with the daily dosage received from cosmic rays and naturally occurring radio activity of about 0.3 mrads and to the dosage required to expose X-ray film to a barely detectable 0.01 density unit above background fog which requires at least 0.1 mrads. Thus, the invention may be safely used for inspecting personnel and parcels without using harmful radiation levels.

Preferably the X-ray tube and associated power supply are conventional. Preferably X-ray tube 14 is operable at variable voltages up to 150 kv to optimize image quality. Preferably X-ray tube 14 is operated water cooled with a peak voltage of 150 kv, peak current 5–10 ma, a 100 percent duty cycle, the power being at constant potential and the focal spot size of 0.4 mm, all these characteristics being readily available.

For the dimensions discussed above and a source spot size of 0.4 mm, a slit 21 width of 0.3 mm will provide 1 mm resolution. If disc 18 were moved closer to detector 25, a wider slit could be used, but the disc diameter would increase proportionately. Conversely, a smaller disc could be used if it were moved closer to X-ray tube 25, but the slit size would have to be reduced. A 2-foot diameter disc with 0.3 millimeter slits located midway between tube 14 and detector 25 is a satisfactory compromise between rotation of a larger disc at higher speeds and fabrication of smaller slits. The slits themselves are shaped to collimate the beam along all pencils comprising the fan and may be fabricated from tungsten inserts installed in the disc. The rate of rotation of disc 18 is related to the time available for a full exposure. For 500 scan lines in 2 seconds, disc 18 generating six scans per revolution rotates at 250/6 revolutions per second or 2,500 rpm, a rate readily achieved with standard motors.

A preferred form for detector 25 comprises a sodium iodide crystal that detects X-rays below 200 kev with 100 percent efficiency. Such a detector with dimensions 1 × 1 × 24 inches can be readily fabricated from two or three shorter pieces of standard material. The energy of each X-ray interacting in sodium iodide is converted to light sufficiently large to be easily detected by a photomultiplier. By optically coupling a 1 inch end window photomultiplier to each end of the sodium iodide crystal, there is complete and uniform light collection for X-ray interactions occurring at any position along the length of the detector. The summed currents from the two photomultipliers are proportional to the instantaneous X-ray flux striking the detector to produce an image signal analogous to an ordinary video signal that, after amplification, may be stored and displayed by techniques known in the art.

It is preferred that the amplifier for the summed photomultiplier output currents have a bandwidth from d-c to about 1MHz to retain all information in a 500 scan exposure that may be completely transparent (or opaque) to X-rays for one parcel and may contain structure at the limits of resolution (at 8 microseconds per resolution element) for another parcel, preferably being low noise so as to not limit system sensitivity and providing an output signal at high enough level to be stored. By utilizing as much amplification as practical from the photomultiplier itself, many commercially available amplifiers, such as commonly available oscilloscope preamplifiers are adequate.

In an actual working embodiment of the invention, the X-ray image was reconstructed by employing suitably triggered time-base units to provide successive vertical sweeps, each slightly displaced from its neighbor to produce a television-like raster scan and using the analog signal derived from the photomultiplier tube to intensity modulate the CRT electron beam on a storage oscilloscope to produce an image that was retained long enough for visual inspection.

It is preferred to use a scan converted storage tube of a type well known in the art in order to produce a better image, such systems being commercially available and of the type used to convert slow radar scans to a continuously displayed television picture that is updated at every successive radar scan.

The invention has numerous uses, including medical applications, and may take many different forms. For example, there may be a number of detectors and fan beams arranged for providing a multiplicity of scanning beams. Other techniques may be employed for providing the scanning beams of radiant energy and for detecting transmitted and/or scattered energy.

There has been described a novel radiant energy imaging system characterized by relatively high resolution, low radiation dosage, ease of operation and numerous other features. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed.

What is claimed is:

1. Radiant energy imaging apparatus comprising a source of a pencil beam of *X-ray* radiant energy radiant energy detecting means defining a curve in fixed relationship to said source, means for scanning with said pencil beam said radiant energy detecting means along said curve to provide an image signal representative of the radiant energy response of the medium in a region traversed by said pencil beam along a path to said detecting means, means for relatively displacing said region and an assembly comprising said source and said detecting means to establish relative translating motion in a direction transverse to a line joining said source and said detecting means to produce a sequence of image siganls representative of the radiant energy response of said region in two dimensions, and means responsive to said image signals for producing an image representative of said response.

[ 2. Radiant energy imaging apparatus in accordance with claim 1 wherein said radiant energy comprises X-rays. ]

3. Radiant energy imaging apparatus in accordance with claim 1 wherein said source of a pencil beam comprises, a source of said radiant energy, means for collimating said radiant energy into a slit-like beam, and means defining an aperture for intercepting said slit-like beam to provide said pencil beam, said means for scanning comprising means for relatively moving said aperture and said slit-like beam to effect said scanning.

4. Radiant energy imaging apparatus in accordance with claim 3 wherein said source of an uncollimated beam of said radiant energy comprises an X-ray tube, said means for collimating comprises a plate of X-ray opaque material formed with a slit of X-ray transparent material, said means defining an aperture comprises a radial slit that is X-ray transparent in an X-ray opaque disc, and said means for relatively moving comprises means for rotating said disc to move said radial slit along said first-mentioned slit.

5. Radiant energy imaging apparatus in accordance with claim [2] *1* wherein, said detecting means comprises means for converting incident X-ray energy into light energy, and photodetecting means responsive to the latter light energy for providing an electrical image signal that is amplitude modulated in proportion to the instantaneous X-ray flux incident upon said detecting means.

6. Radiant energy imaging apparatus in accordance with claim 5 and further comprising a television display system responsive to said image signal for displaying a corresponding image.

7. Radiant energy imaging apparatus in accordance with claim 5 wherein said means is a crystal from the group consisting of sodium iodide and cesium iodide, and said photodetecting means comprises photomultipliers at each end of said crystal means.

8. Radiant energy imaging apparatus in accordance with claim 6 and further comprising means for relatively displacing a region to be scanned and said curve to display a two-dimensional image of the X-ray response of said region being scanned.

9. Radiant energy imaging apparatus in accordance with claim 7 and further comprising means for relatively displacing a region to be scanned and said curve to provide a two-dimensional image signal of the X-ray response of said region being scanned.

10. Radiant energy imaging apparatus in accordance with claim 1 wherein said radiant energy comprises X-rays, said source of a pencil beam comprising, a source of said radiant energy, said radiant energy detecting means defining a line, means including a plate of X-ray opaque material formed with a linear slit of X-ray transparent material for collimating said radiant energy into a slit-like beam embracing a plane substantially including said slit and said straight line, an X-ray tube comprising a source of the uncollimated beam of said radiant energy, an X-ray opaque disc formed with at least one radial slit that is X-ray transparent, and means for rotatably supporting said disc with its plane generally perpendicular to the plane of said slit-like beam so that rotation of said disc causes said radial slit to transmit contiguous portions of said slit-like beam to said detecting means to effectively provide said pencil beam scanning said straight line from one end to the other.

11. Radiant energy imaging apparatus in accordance with claim 10 wherein said means for relatively displacing comprises means for translating an object to be imaged transverse to and across said plane substantially including said straight line and said slit-like beam.

12. Radiant energy imaging apparatus in accordance with claim 10 wherein said means for relatively displacing comprises means for moving said source and said detecting means together while said region remains stationary.

* * * * *